(12) United States Patent
Kuwahara et al.

(10) Patent No.: US 12,728,743 B2
(45) Date of Patent: Sep. 8, 2026

(54) ELECTRICALLY DRIVEN CONSTRUCTION MACHINE

(71) Applicant: Hitachi Construction Machinery Tierra Co., Ltd., Koka (JP)

(72) Inventors: Takuma Kuwahara, Koka (JP); Seiichi Kihara, Koka (JP); Shogo Kimura, Koka (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 16 days.

(21) Appl. No.: 19/100,161

(22) PCT Filed: Aug. 8, 2023

(86) PCT No.: PCT/JP2023/029008

§ 371 (c)(1),
(2) Date: Jan. 31, 2025

(87) PCT Pub. No.: WO2024/070255

PCT Pub. Date: Apr. 4, 2024

(65) Prior Publication Data

US 2026/0042367 A1 Feb. 12, 2026

(30) Foreign Application Priority Data

Sep. 27, 2022 (JP) ................................ 2022-154228

(51) Int. Cl.
*B60L 53/18* (2019.01)
*B60L 53/30* (2019.01)
(Continued)

(52) U.S. Cl.
CPC ............... *B60L 53/18* (2019.02); *B60L 53/30* (2019.02); *E02F 9/125* (2013.01); *E02F 9/207* (2013.01);
(Continued)

(58) Field of Classification Search
CPC .......... B60L 53/18; B60L 53/30; E02F 9/125; E02F 9/207; E02F 9/2091; E02F 9/24; B60Y 2200/412
See application file for complete search history.

(56) References Cited

U.S. PATENT DOCUMENTS 11,225,149 B2 * 1/2022 Kaneda .................. H02J 1/102
2006/0108309 A1 * 5/2006 Sato ........................ E02F 3/325
212/232
(Continued)

FOREIGN PATENT DOCUMENTS

JP 2008-190231 A 8/2008
JP 2010-65445 A 3/2010
(Continued)

OTHER PUBLICATIONS

International Search Report (PCT/ISA/210) issued in PCT Application No. PCT/JP2023/029008 dated Oct. 10, 2023 with English translation (5 pages).
(Continued)

*Primary Examiner* — Ramsey Refai
(74) *Attorney, Agent, or Firm* — Crowell & Moring LLP

(57) ABSTRACT

An electrically driven construction machine that can suppress damage to a feeding cable is provided. An electrically driven excavator includes a swing angle sensor that senses the swing angle of a swing structure, a cable stand that is disposed on the swing structure and has a holding unit that holds a feeding cable, a rotational angle sensor that senses the rotational angle of the holding unit of the cable stand, a swing lock valve, and a controller. The controller computes the position of the holding unit of the cable stand on the basis of sensing results of the swing angle sensor and the rotational angle sensor when a connection sensor senses a state in which the feeding cable is connected to a feeding port. Further, the controller controls the swing lock valve to an
(Continued)

interrupting state to inhibit a swing of the swing structure when the computed position of the holding unit goes outside a predetermined range.

4 Claims, 16 Drawing Sheets

(51) Int. Cl.
*E02F 9/12* (2006.01)
*E02F 9/20* (2006.01)
*E02F 9/24* (2006.01)

(52) U.S. Cl.
CPC .............. *E02F 9/2091* (2013.01); *E02F 9/24* (2013.01); *B60Y 2200/412* (2013.01)

(56) References Cited

U.S. PATENT DOCUMENTS

2010/0289443 A1* 11/2010 Mazumdar ................ H02P 5/74 318/440
2013/0197766 A1* 8/2013 Kurikuma ............. E02F 9/2246 701/50
2019/0027867 A1* 1/2019 Ognjanovski ...... H01R 13/6397
2021/0129682 A1* 5/2021 Kaneda ................... H02J 1/102
2022/0275601 A1* 9/2022 Kunizawa ............... E02F 3/325
2023/0128121 A1* 4/2023 Furukawa ............... E02F 3/325 307/9.1

FOREIGN PATENT DOCUMENTS

JP 4504940 B2 7/2010
JP 2017-2625 A 1/2017
JP 2018-84099 A 5/2018

OTHER PUBLICATIONS

Japanese-language Written Opinion (PCT/ISA/237) issued in PCT Application No. PCT/JP2023/029008 dated Oct. 10, 2023 with English translation (5 pages).
International Preliminary Report on Patentability (PCT/IB/338 & PCT/IB/373) issued in PCT Application No. PCT/JP2023/029008 dated Apr. 10, 2025, including English translation of Written Opinion (PCT/ISA/237) (5 pages).

* cited by examiner

[FIG. 1]

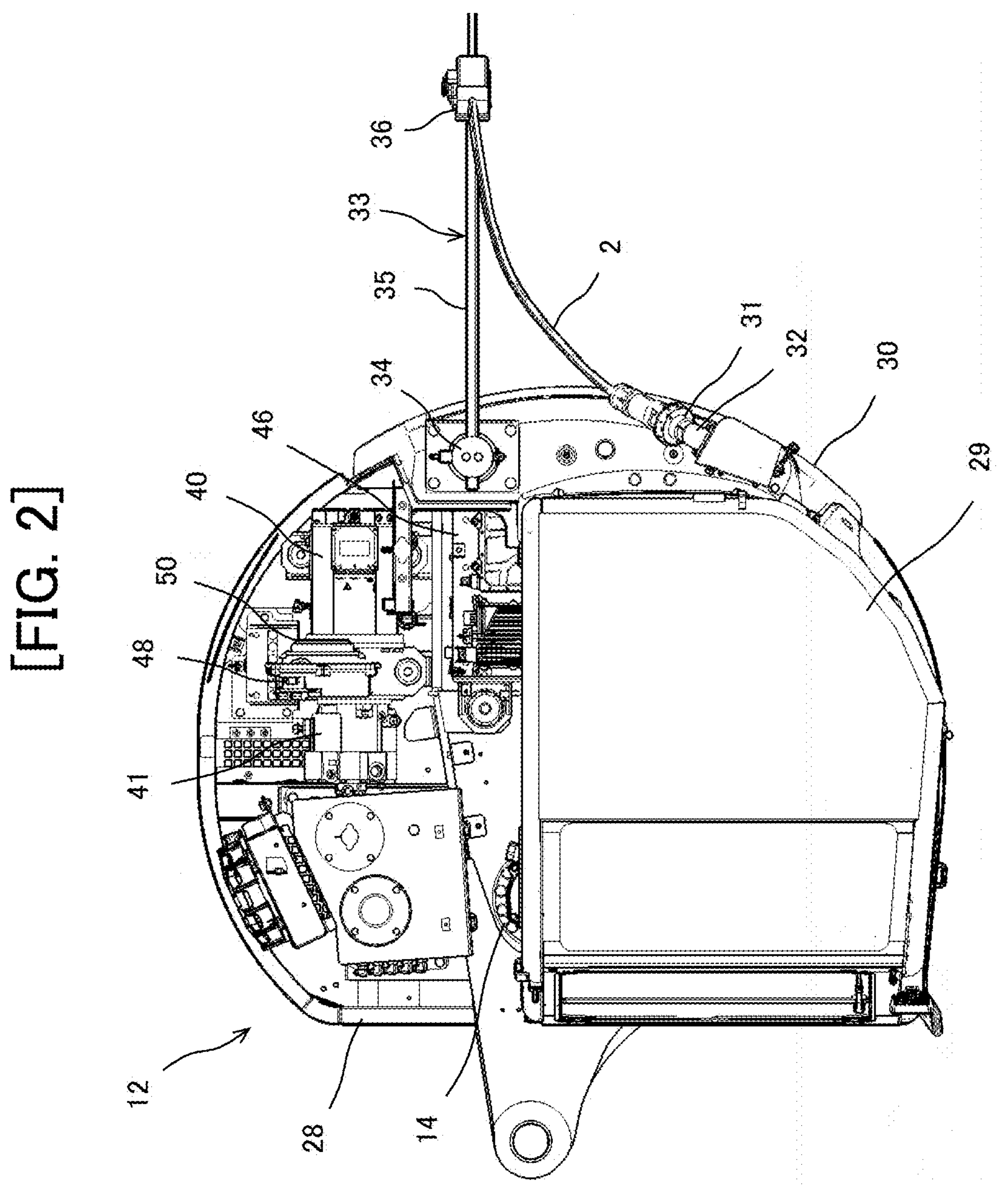
[FIG. 2]
36
33
35
2
31
32
30
34
46
40
50
48
41
29
12
28
14

[FIG. 3]
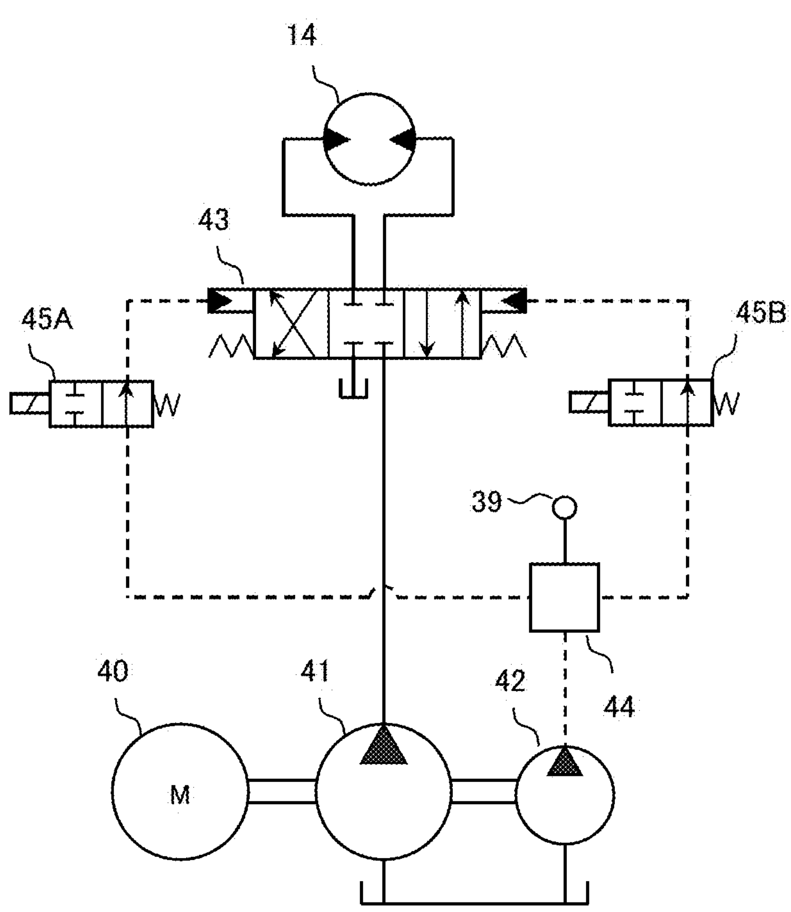

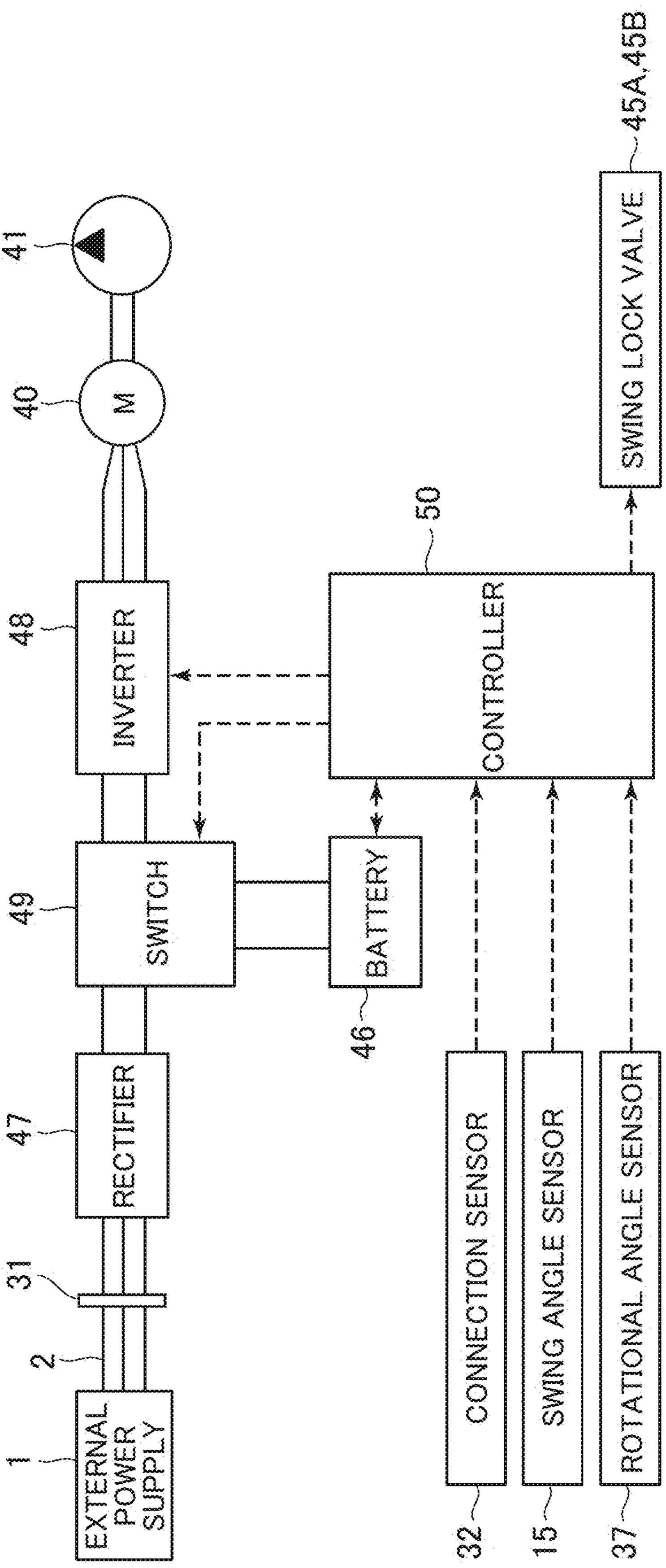
[FIG. 4]
EXTERNAL POWER SUPPLY
RECTIFIER
SWITCH
INVERTER
M
BATTERY
CONTROLLER
SWING LOCK VALVE
CONNECTION SENSOR
SWING ANGLE SENSOR
ROTATIONAL ANGLE SENSOR
1
2
31
47
49
48
40
41
46
50
45A,45B
32
15
37

[FIG. 5]
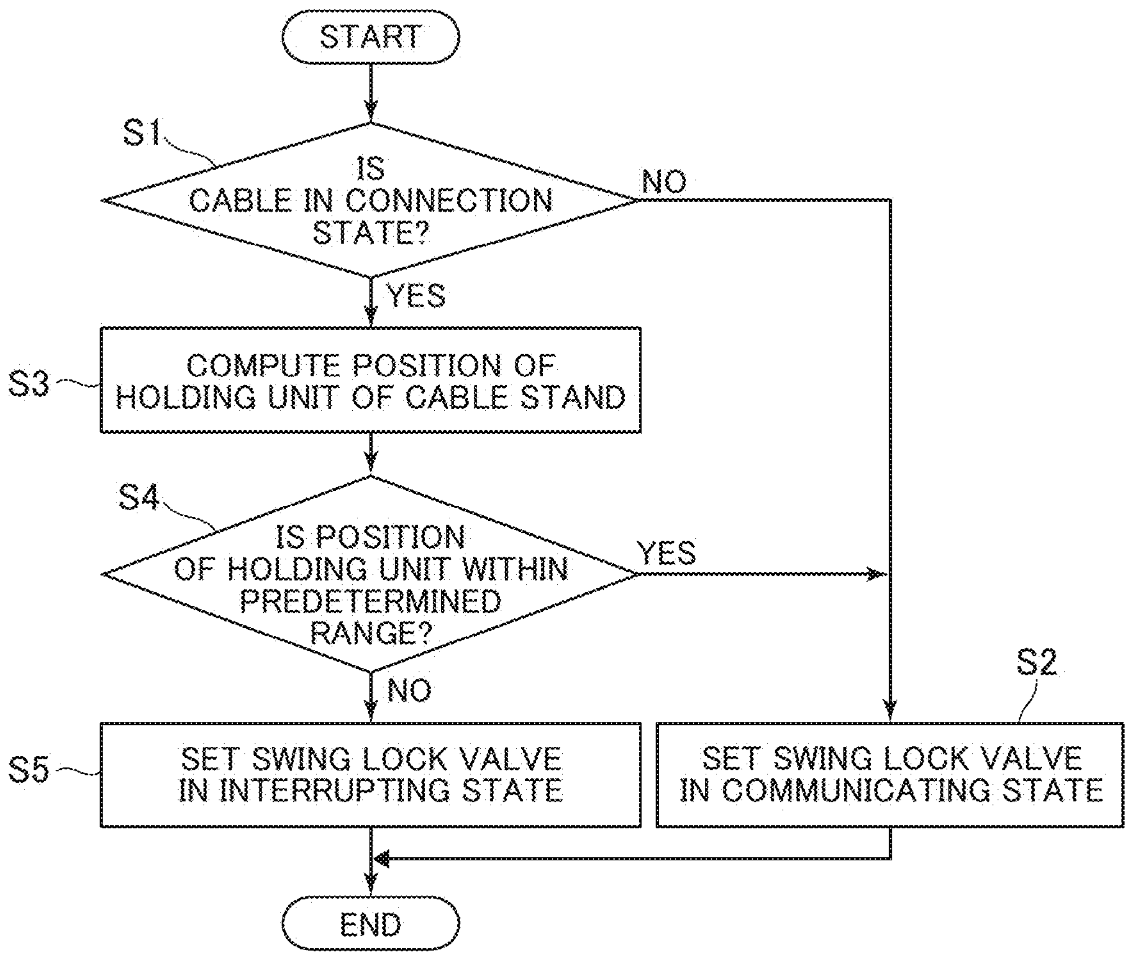

[FIG. 6A]
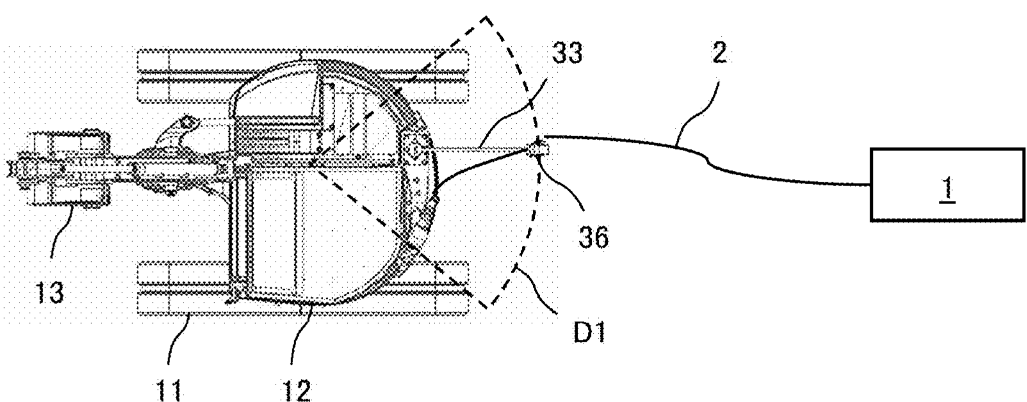
[FIG. 6B]
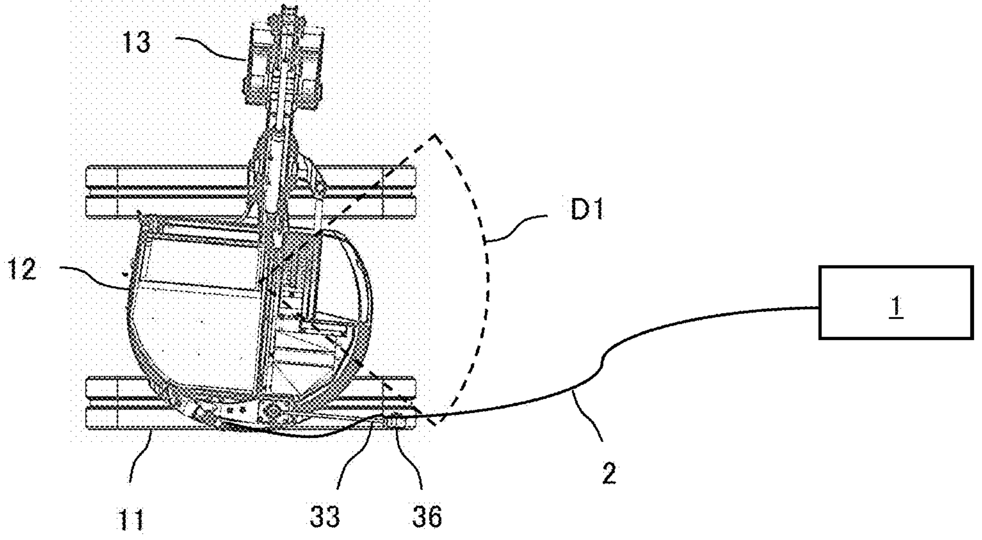

[FIG. 7]

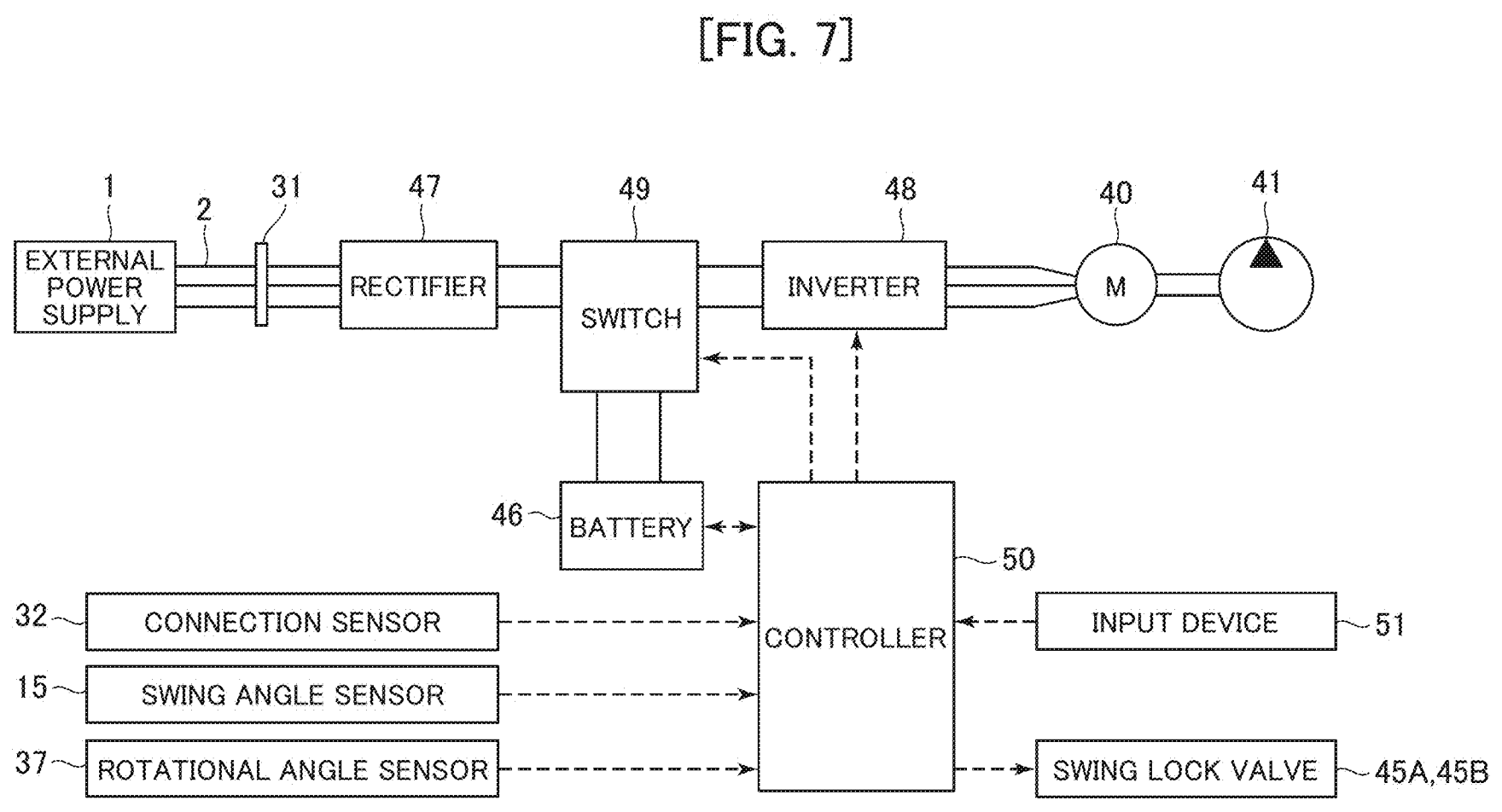

1 EXTERNAL POWER SUPPLY

2

31

47 RECTIFIER

49 SWITCH

48 INVERTER

40 M

41

46 BATTERY

50 CONTROLLER

32 CONNECTION SENSOR

15 SWING ANGLE SENSOR

37 ROTATIONAL ANGLE SENSOR

51 INPUT DEVICE 45A,45B SWING LOCK VALVE

[FIG. 8]
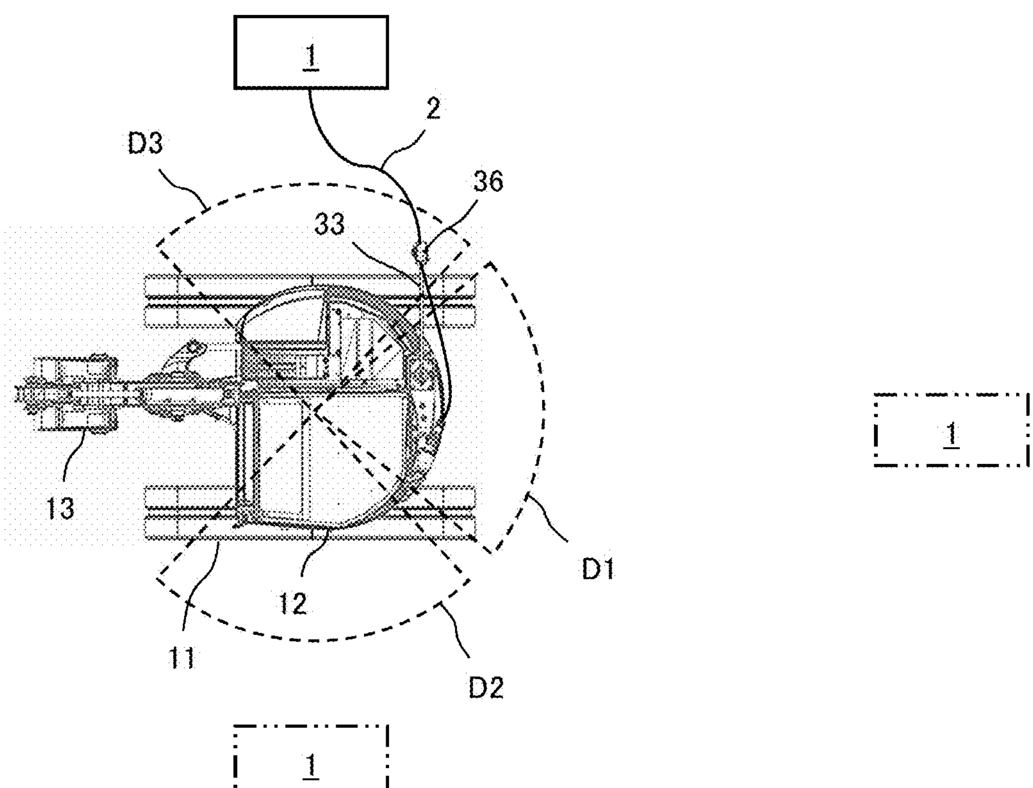

[FIG. 9A]
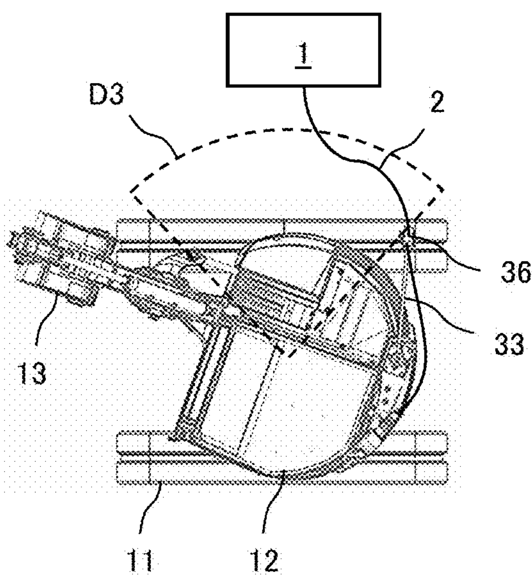
[FIG. 9B]
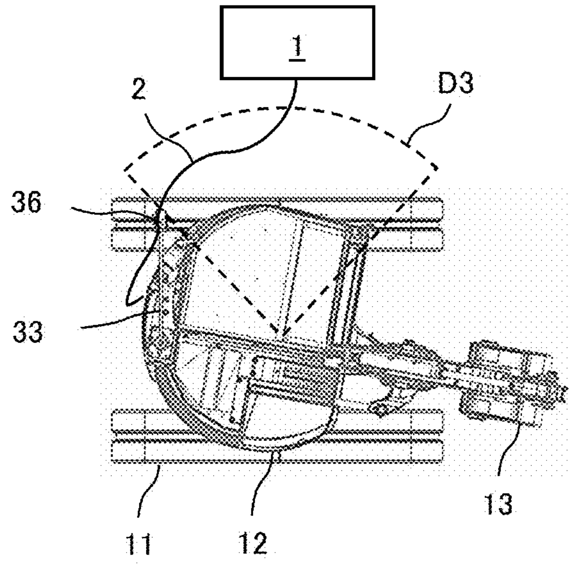

[FIG. 10]
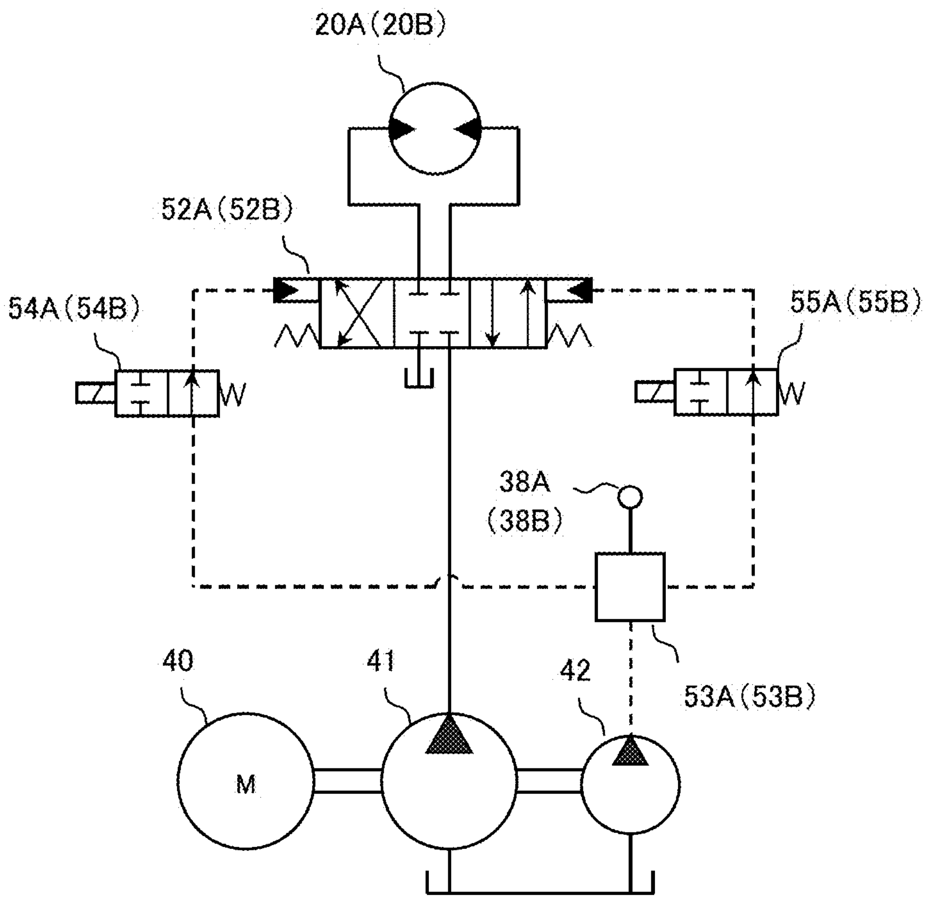

[FIG. 11]
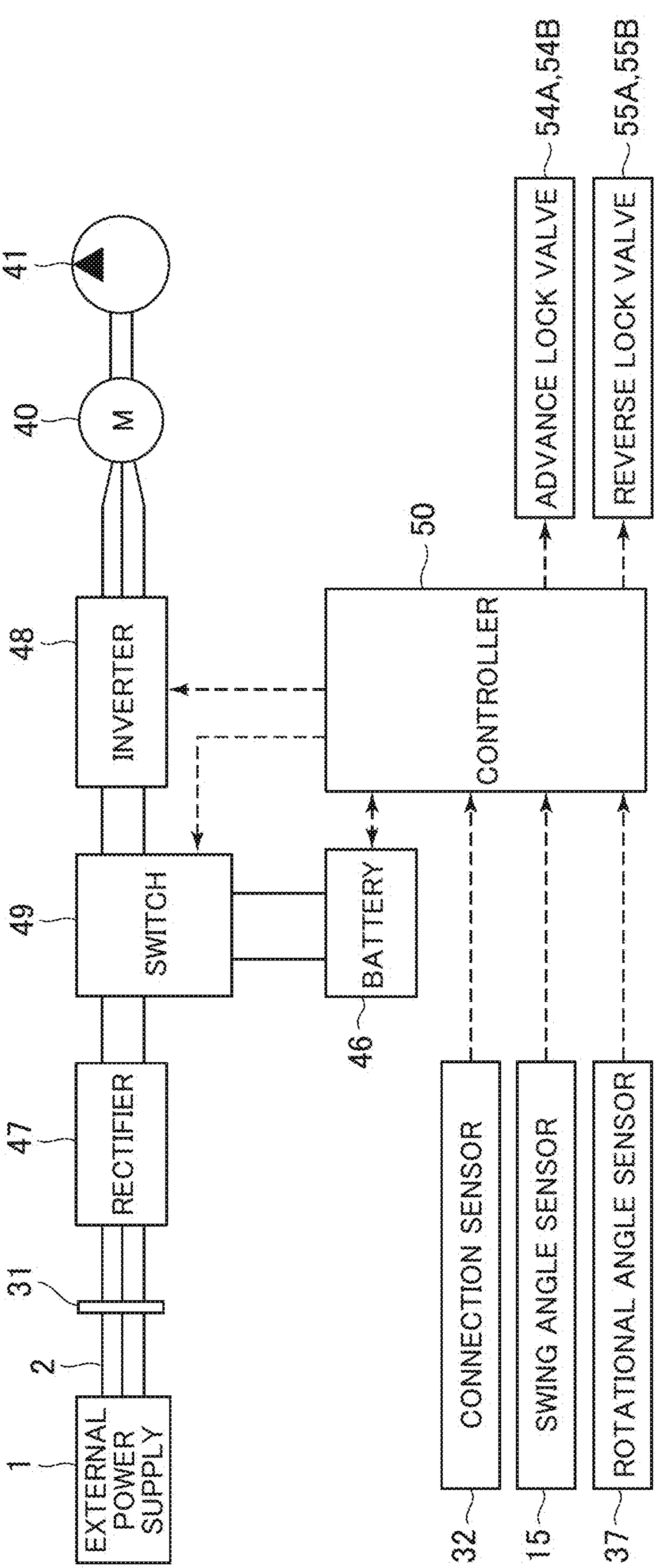

[FIG. 12]
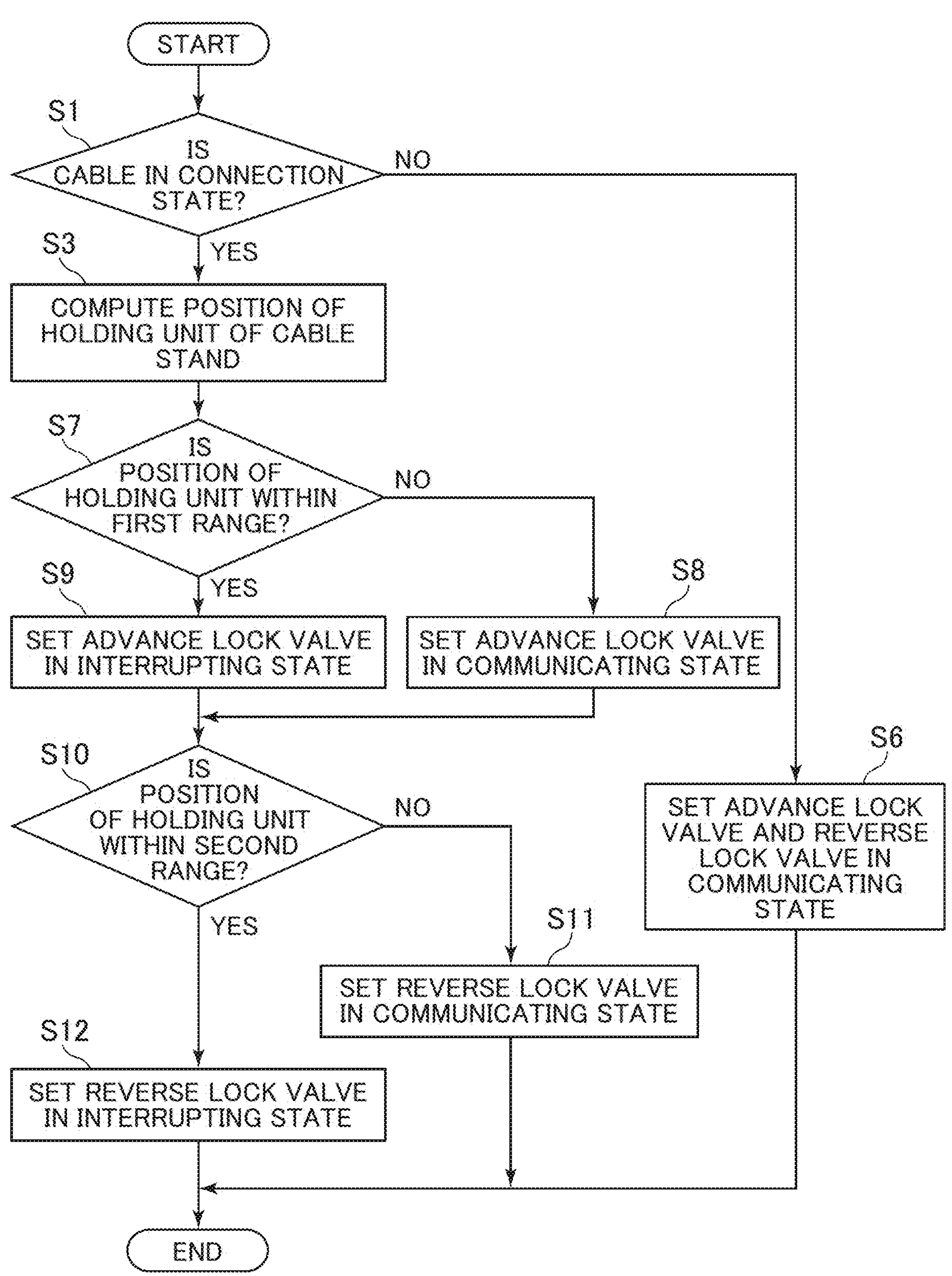

[FIG. 13A]
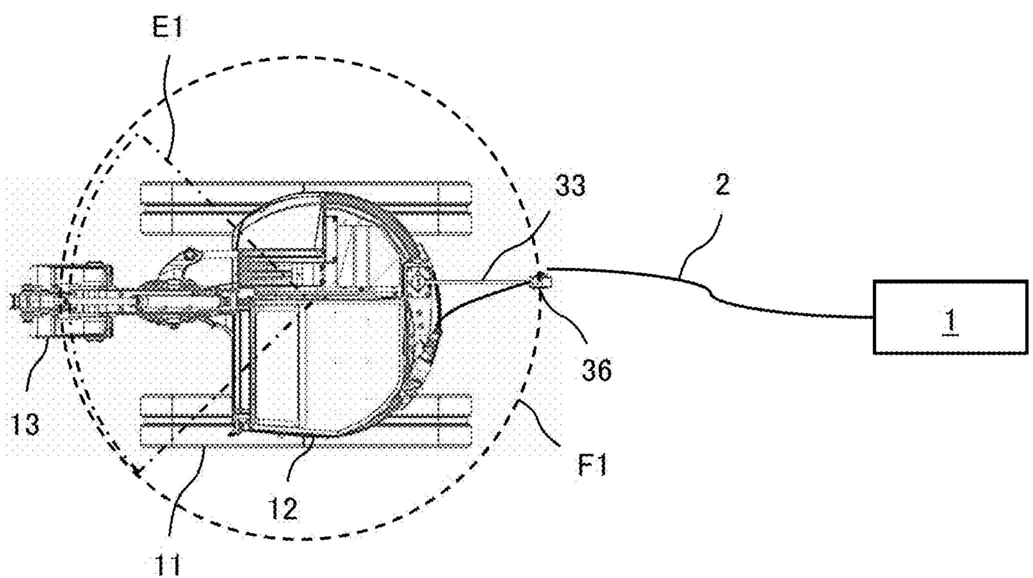
[FIG. 13B]
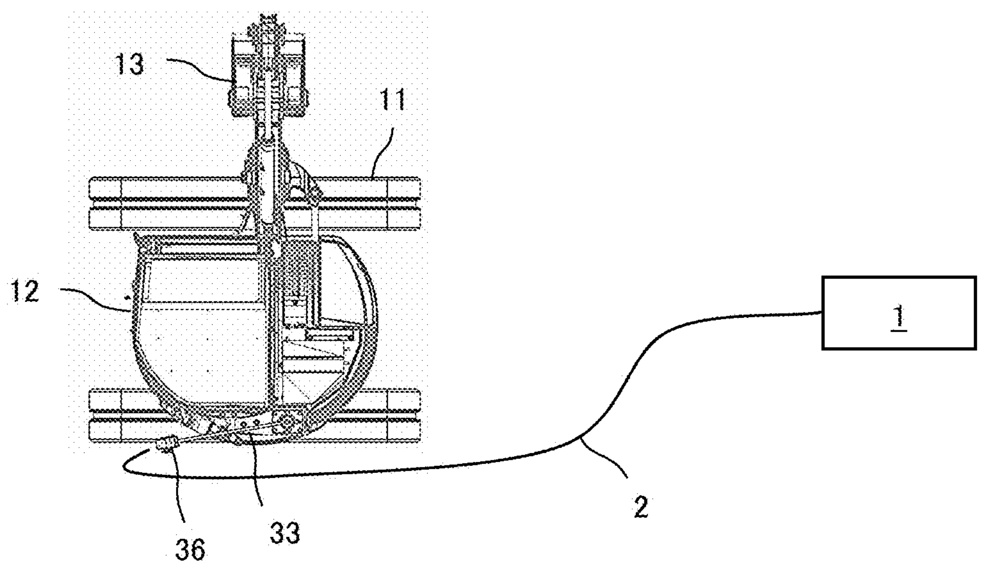

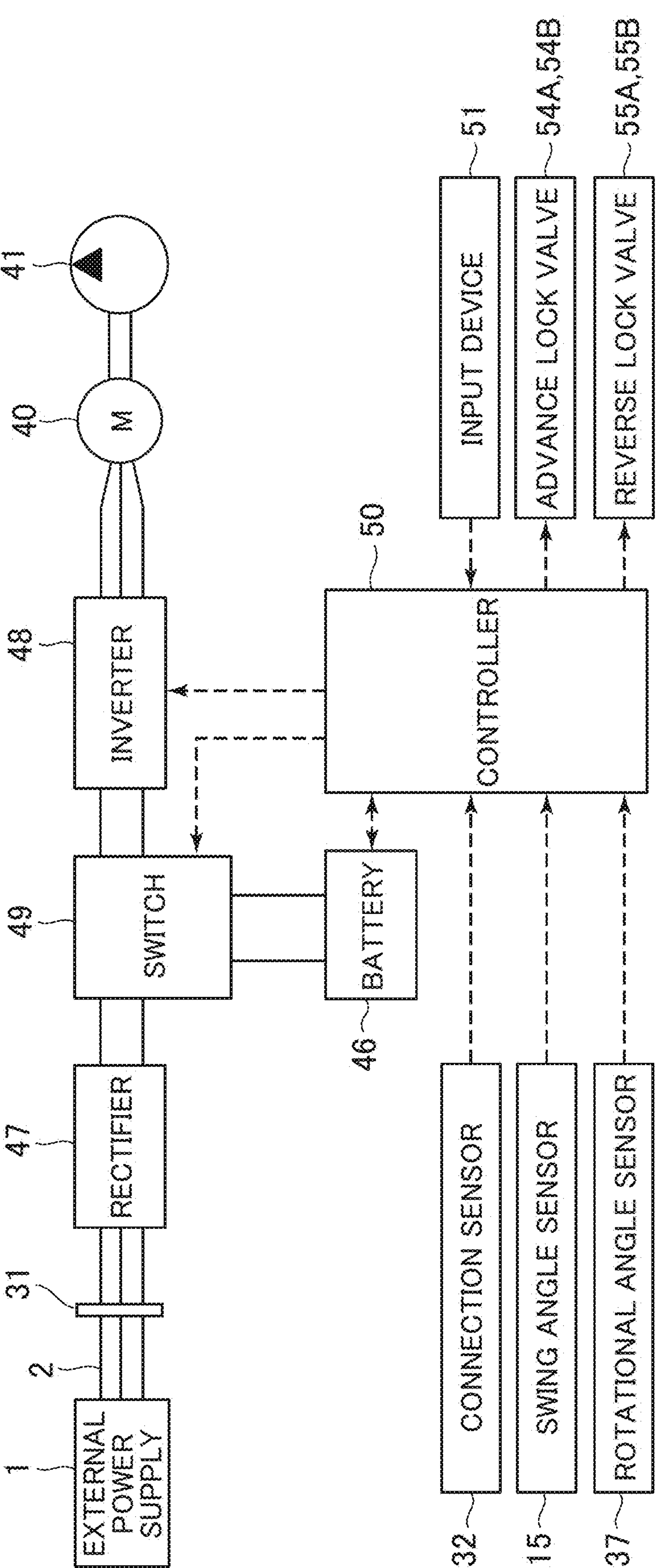
[FIG. 14]
EXTERNAL POWER SUPPLY
1
2
31
RECTIFIER
47
SWITCH
49
INVERTER
48
M
40
41
BATTERY
46
CONTROLLER
50
INPUT DEVICE
51
ADVANCE LOCK VALVE
54A,54B
REVERSE LOCK VALVE
55A,55B
CONNECTION SENSOR
32
SWING ANGLE SENSOR
15
ROTATIONAL ANGLE SENSOR
37

[FIG. 15]
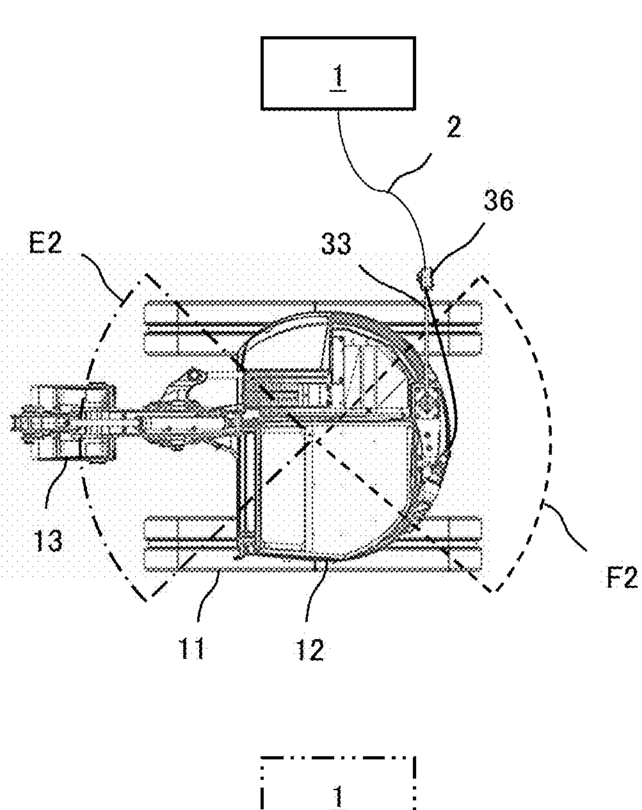

[FIG. 16A]
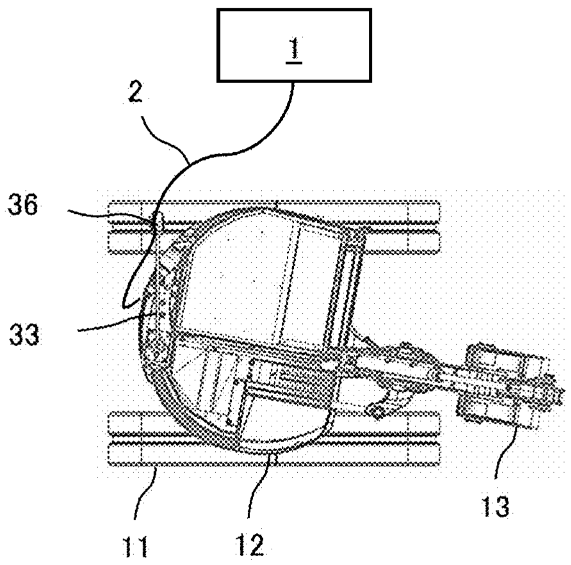
[FIG. 16B]
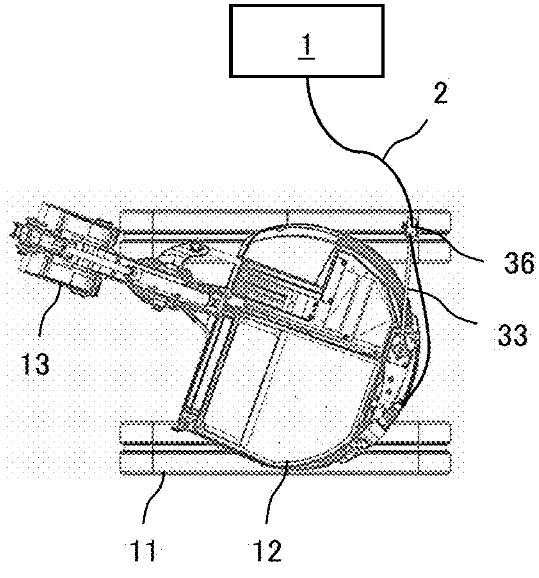

ELECTRICALLY DRIVEN CONSTRUCTION MACHINE

TECHNICAL FIELD

The present invention relates to an electrically driven construction machine to which a feeding cable can be connected.

BACKGROUND ART

An electrically driven excavator as one type of electrically driven construction machines includes, for example, a track structure; a swing structure swingably provided to an upper side of the track structure; a work device coupled to a front side of the swing structure; an electrically driven motor mounted in the swing structure; a hydraulic pump mounted in the swing structure and driven by the electrically driven motor; and a hydraulic actuator driven by hydraulic fluid delivered from the hydraulic pump. Some types of electrically driven excavators are configured to allow a feeding cable to be connected to the swing structure side, and electric power from an external power supply is supplied via the feeding cable. Further, the electrically driven motor is driven by the electric power supplied via the feeding cable. Alternatively, a battery mounted in the swing structure is charged by the electric power supplied via the feeding cable, and the electrically driven motor is driven by the electric power of the battery.

An electrically driven excavator of Patent Document 1 is configured to be unable to perform an excavator action (specifically a swing action and a travelling action) when the feeding cable is connected thereto. This makes it possible to prevent damage to the feeding cable.

An electrically driven excavator of Patent Document 2 is configured to be able to perform an excavator action when the feeding cable is connected thereto. The electrically driven excavator of Patent Document 2 includes a cable stand for suppressing damage to the feeding cable. The cable stand is disposed on the rear side of the swing structure (in other words, on an opposite side of the work device). The cable stand has a holding unit that holds the feeding cable. The cable stand is configured such that the holding unit is revolvable about a vertical axis. Moreover, according to a swing of the swing structure, for example, the holding unit of the cable stand revolves in the opposite direction, so that an excessive load is not applied to the feeding cable.

PRIOR ART DOCUMENTS

Patent Documents

Patent Document 1: JP-4504940-B
Patent Document 2: JP-2018-084099-A

SUMMARY OF THE INVENTION

Problem to be Solved by the Invention

Adopting the cable stand of Patent Document 2 can suppress damage to the feeding cable while an excavator action is performed, even in a state in which the feeding cable is connected. However, depending on the swing angle of the swing structure, the position of the holding unit of the cable stand changes significantly, and the feeding cable held by the holding unit of the cable stand may be damaged by coming into contact with the track structure. In addition, depending on the position of the holding unit of the cable stand and the travelling direction of the track structure, the feeding cable held by the holding unit of the cable stand may be damaged by being trodden by the track structure that is travelling.

The present invention has been made in view of the above-described circumstances. It is an object of the present invention to provide an electrically driven construction machine that can suppress damage to the feeding cable.

Means for Solving the Problem

In order to achieve the above object, according to the representative present invention, there is provided an electrically driven construction machine including a track structure, a swing structure provided swingably to an upper side of the track structure, a work device coupled to the swing structure, a feeding port disposed in the swing structure and connected with a feeding cable from an external power supply, a cable stand that is disposed on the swing structure, has a holding unit configured to hold the feeding cable, and is configured such that the holding unit is revolvable about a vertical axis, a connection sensor configured to sense a state in which the feeding cable is connected to the feeding port, a swing angle sensor configured to sense a swing angle of the swing structure, a rotational angle sensor configured to sense a rotational angle of the holding unit of the cable stand, a swing lock device configured to set a locking state of inhibiting a swing action of the swing structure, and a controller configured to control the swing lock device, the controller being configured to compute a position of the holding unit of the cable stand on the basis of sensing results of the swing angle sensor and the rotational angle sensor when the connection sensor senses the state in which the feeding cable is connected to the feeding port, and control the swing lock device to the locking state when the computed position of the holding unit of the cable stand goes outside a predetermined range.

Advantages of the Invention

According to the present invention, it is possible to suppress damage to the feeding cable attributable to operation of the electrically driven construction machine.

BRIEF DESCRIPTION OF THE DRAWINGS

FIG. 1 is a side view illustrating a structure of an electrically driven excavator in a first embodiment of the present invention.

FIG. 2 is a top view illustrating a structure of a swing structure of the electrically driven excavator in the first embodiment of the present invention.

FIG. 3 is a diagram illustrating a configuration related to a swing motor in a configuration of a drive system of the electrically driven excavator in the first embodiment of the present invention.

FIG. 4 is a diagram illustrating a configuration of an electric system of the electrically driven excavator in the first embodiment of the present invention.

FIG. 5 is a flowchart illustrating the contents of swing lock control in the first embodiment of the present invention.

FIG. 6A is a top view illustrating a specific example of the action of the electrically driven excavator in the first embodiment of the present invention, and illustrating a predetermined range set for the position of a holding unit of a cable stand.

FIG. 6B is a top view illustrating a specific example of the action of the electrically driven excavator in the first embodiment of the present invention, and illustrating the predetermined range set for the position of the holding unit of the cable stand.

FIG. 7 is a diagram illustrating a configuration of an electric system of an electrically driven excavator in a first modification of the present invention.

FIG. 8 is a top view illustrating predetermined ranges set for the position of the holding unit of the cable stand in the first modification of the present invention.

FIG. 9A is a top view illustrating a specific example of the action of the electrically driven excavator in the first modification of the present invention.

FIG. 9B is a top view illustrating a specific example of the action of the electrically driven excavator in the first modification of the present invention.

FIG. 10 is a diagram illustrating a configuration related to the travelling motor in a configuration of a drive system of an electrically driven excavator in a second embodiment of the present invention.

FIG. 11 is a diagram illustrating a configuration of an electric system of the electrically driven excavator in the second embodiment of the present invention.

FIG. 12 is a flowchart illustrating the contents of travelling lock control in the second embodiment of the present invention.

FIG. 13A is a top view illustrating a specific example of the action of the electrically driven excavator in the second embodiment of the present invention, and illustrating a first range and a second range set for the position of the holding unit of the cable stand.

FIG. 13B is a top view illustrating a specific example of the action of the electrically driven excavator in the second embodiment of the present invention.

FIG. 14 is a diagram illustrating a configuration of an electric system of an electrically driven excavator in a second modification of the present invention.

FIG. 15 is a top view illustrating a first range and a second range set for the position of the holding unit of the cable stand in the second modification of the present invention.

FIG. 16A is a top view illustrating a specific example of the action of the electrically driven excavator in the second modification of the present invention.

FIG. 16B is a top view illustrating a specific example of the action of the electrically driven excavator in the second modification of the present invention.

MODES FOR CARRYING OUT THE INVENTION

A first embodiment of the present invention will be described with reference to the drawings.

Figure 1:
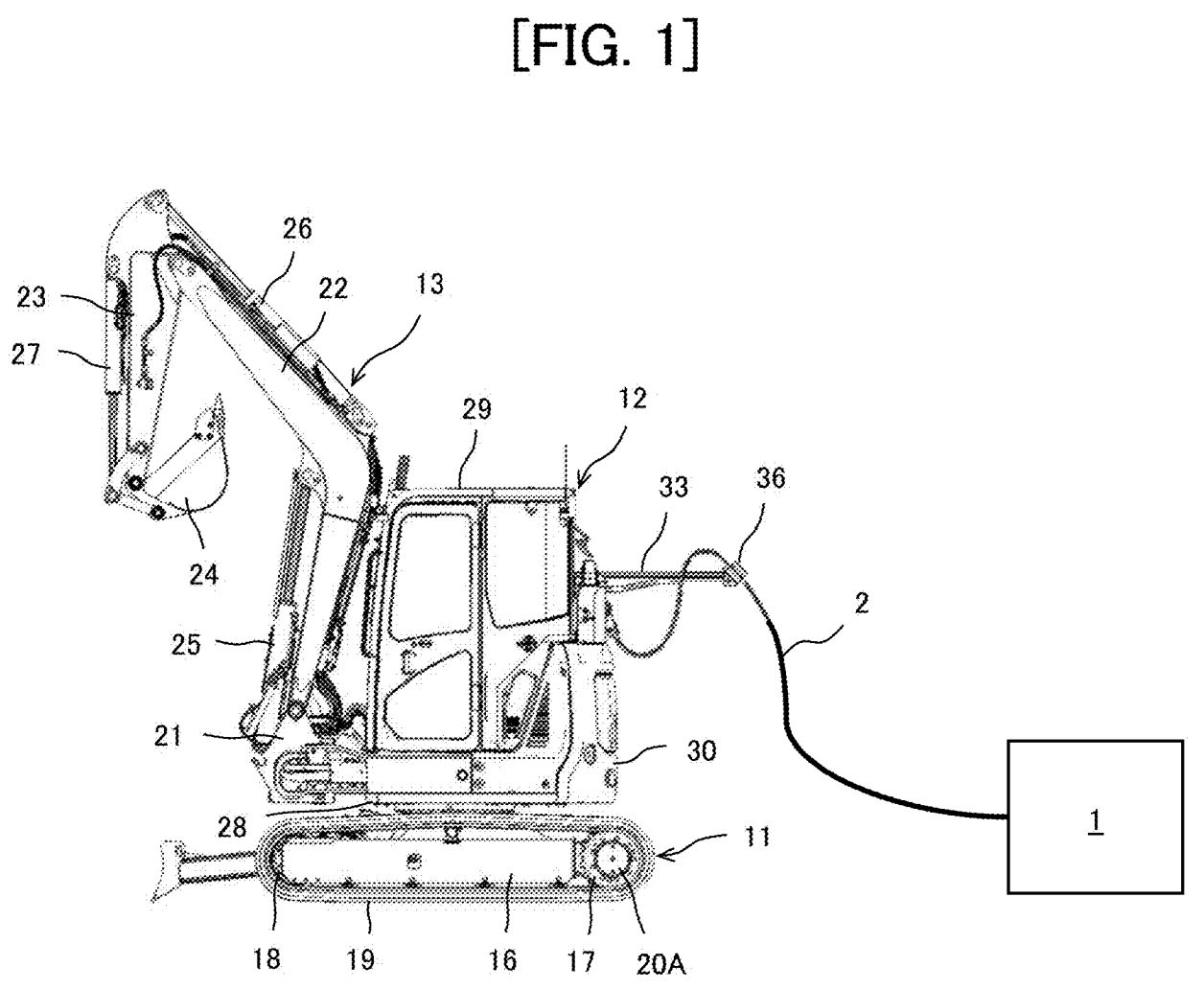

FIG. 1 is a side view illustrating a structure of an electrically driven excavator in the present embodiment. FIG. 2 is a top view illustrating a structure of a swing structure of the electrically driven excavator in the present embodiment. Incidentally, FIG. 2 illustrates a state in which a part of an exterior cover of the swing structure is removed in order to illustrate apparatuses mounted in the swing structure.

The electrically driven excavator in the present embodiment includes a track structure 11, a swing structure 12 swingably provided to an upper side of the track structure 11, and a work device 13 coupled to a front side of the swing structure 12 (left side of FIG. 1). The swing structure 12 is swung by a rotation of a swing motor 14. The swing angle of the swing structure 12 is sensed by a swing angle sensor 15 (see FIG. 4 to be described later).

The track structure 11 includes a track frame 16 having an H-shape as viewed from above, for example; a driving wheel 17 disposed at a rear end of a left side of the track frame 16 (near side with respect to a paper plane of FIG. 1); a driven wheel 18 disposed at a front end of the left side of the track frame 16; a crawler belt 19 on the left side that is wound around the driving wheel 17 and the driven wheel 18 on the left side; and a travelling motor 20A on the left side for driving the driving wheel 17 on the left side (in turn, the crawler belt 19 on the left side).

In addition, the track structure 11 includes a driving wheel (not illustrated) disposed at a rear end of a right side of the track frame 16 (far side with respect to the paper plane of FIG. 1); a driven wheel (not illustrated) disposed at a front end of the right side of the track frame 16; a crawler belt on the right side that is wound around the driving wheel and the driven wheel on the right side; and a travelling motor 20B (see the diagram to be described later) on the right side for driving the driving wheel on the right side (in turn, the crawler belt on the right side).

The work device 13 includes, for example, a swing post 21 coupled to a front side of the swing structure 12 in such a manner as to be rotatable in a left-right direction; a boom 22 coupled to an upper side of the swing post 21 in such a manner as to be rotatable in an upward-downward direction; an arm 23 coupled to a distal end side of the boom 22 in such a manner as to be rotatable in the upward-downward direction; and a bucket 24 coupled to a distal end side of the arm 23 in such a manner as to be rotatable in the upward-downward direction. The swing post 21 is rotated by expansion or contraction of a swing cylinder (not illustrated). The boom 22 is rotated by expansion or contraction of a boom cylinder 25. The arm 23 is rotated by expansion or contraction of an arm cylinder 26. The bucket 24 is rotated by expansion or contraction of a bucket cylinder 27.

The swing structure 12 includes a swing frame 28 forming a lower substructure; a cab (operation room) 29 provided to the left side of the swing frame 28 (the near side with respect to the paper plane of FIG. 1 and a lower side of FIG. 2); and a counterweight 30 provided to a rear side of the swing frame 28 (right sides of FIG. 1 and FIG. 2).

In addition, the swing structure 12 includes a feeding port 31 that is disposed on the upper side of the counterweight 30 and to which a feeding cable 2 from an external power supply 1 (for example, a commercial power supply) is connected; a connection sensor 32 that senses a state in which the feeding cable 2 is connected to the feeding port 31; and a cable stand 33 that is provided to the upper side of the counterweight 30 to guide the feeding cable 2.

The cable stand 33 includes a rotary shaft 34 supported in such a manner as to be rotatable about a vertical axis; a supporting frame 35 that extends in a horizontal direction from the rotary shaft 34; a holding unit 36 (clamp) provided to a distal end side of the supporting frame 35 to hold the feeding cable 2; and a rotational angle sensor 37 (see FIG. 4 to be described later) that senses the rotational angle of the rotary shaft 34, that is, the rotational angle of the holding unit 36.

When the swing structure 12 swings in a clockwise direction as viewed from above with respect to the track structure 11, for example, the holding unit 36 of the cable stand 33 rotates in a counterclockwise direction as viewed from above with respect to the swing structure 12. In contrast, when the swing structure 12 swings in a counterclockwise direction as viewed from above with respect to the track structure 11, for example, the holding unit of the cable stand 33 rotates in a clockwise direction as viewed from above with respect to the swing structure 12. This inhibits an excessive load from being applied to the feeding cable 2. However, for a reason of, for example, avoiding contact between the holding unit 36 of the cable stand 33 and the cab 29 or the like, a rotation range of the rotary shaft 34, that is, a rotation range of the holding unit 36, is limited by stoppers not illustrated in the figures.

In the present embodiment, a rotational angle in a state in which the holding unit 36 is directed in a rearward direction of the swing structure 12 (see FIG. 1 and FIG. 2) is defined as a reference value (0 degrees) of the rotational angle of the holding unit 36 of the cable stand 33. Further, when the rotational angle of the holding unit 36 is so defined as to increase as the holding unit 36 rotates in a clockwise direction from the above-described state, the rotational angle of the holding unit 36 is limited to 90 degrees, for example. In addition, when the rotational angle of the holding unit 36 is so defined as to increase as the holding unit 36 rotates in a counterclockwise direction from the above-described state, the rotational angle of the holding unit 36 is limited to 90 degrees, for example.

The cab 29 is provided with a cab seat (not illustrated) in which a driver is to be seated. A front side of the cab seat is provided with travelling operation lever pedals 38A and 38B (see FIG. 10 to be described later) that can be operated by the driver. The travelling operation lever pedals 38A and 38B give an instruction for action of the track structure 11 by operation thereof in a front-rear direction. A swing operation pedal (not illustrated) that can be operated by the driver is provided on the right side of the travelling operation lever pedals 38A and 38B. The swing operation pedal gives an instruction for action of the swing post 21 by operation thereof in the left-right direction.

A work operation lever 39 (see FIG. 3 to be described later) that can be operated by the driver is provided to the left side of the cab seat. The work operation lever 39 gives an instruction for action of the swing structure 12 by operation thereof in the left-right direction, and gives an instruction for action of the arm 23 by operation thereof in the front-rear direction. A work operation lever (not illustrated) that can be operated by the worker is provided to the right side of the cab seat. This work operation lever gives an instruction for action of the bucket 24 by operation thereof in the left-right direction, and gives an instruction for action of the boom 22 by operation thereof in the front-rear direction.

The electrically driven excavator includes a drive system that drives a plurality of hydraulic actuators (specifically, the swing motor 14, the travelling motors 20A and 20B, the swing cylinder, the boom cylinder 25, the arm cylinder 26, and the bucket cylinder 27 described above). FIG. 3 is a diagram illustrating a configuration related to the swing motor in a configuration of the drive system of the electrically driven excavator in the present embodiment.

The drive system in the present embodiment includes an electrically driven motor 40; a hydraulic pump 41 and a pilot pump 42 driven by the electrically driven motor 40; a swing control valve 43 that controls a flow (specifically, a direction and a flow rate) of hydraulic fluid from the hydraulic pump 41 to the swing motor 14; and a work operation device 44 that switches the swing control valve 43. Incidentally, the work operation device 44 is mounted in the cab 29 of the swing structure 12, and the electrically driven motor 40, the hydraulic pump 41, the pilot pump 42, and the swing control valve 43 are mounted in another part of the swing structure 12 (see FIG. 2 described above).

The work operation device 44 includes the work operation lever 39 described above; a first pilot valve (not illustrated) that generates a pilot pressure by reducing a delivery pressure of the pilot pump 42 according to an amount of operation of the work operation lever 39 to the left side; and a second pilot valve (not illustrated) that generates a pilot pressure by reducing the delivery pressure of the pilot pump 42 according to an amount of operation of the work operation lever 39 to the right side.

When the driver operates the work operation lever 39 to the left side, the pilot pressure generated by the first pilot valve according to the operation amount of the work operation lever 39 is output to a pressure receiving portion on one side of the swing control valve 43. Thus, the swing control valve 43 is switched to a switching position on the left side illustrated in the figure, the hydraulic fluid from the hydraulic pump 41 is supplied to a port on the left side illustrated in the figure of the swing motor 14 via the swing control valve 43, and the swing motor 14 rotates in one direction. As a result, the swing structure 12 swings in a left direction (in other words, in the counterclockwise direction as viewed from above).

When the driver operates the work operation lever 39 to the right side, the pilot pressure generated by the second pilot valve according to the operation amount of the work operation lever 39 is output to a pressure receiving portion on another side of the swing control valve 43. Thus, the swing control valve 43 is switched to a switching position on the right side illustrated in the figure, the hydraulic fluid from the hydraulic pump 41 is supplied to a port on the right side illustrated in the figure of the swing motor 14 via the swing control valve 43, and the swing motor 14 rotates in an opposite direction. As a result, the swing structure 12 swings in the right direction (in other words, the clockwise direction as viewed from above).

As one of features of the present embodiment, a swing lock valve 45A that can be switched to an interrupting state and a communicating state is provided to a hydraulic line between the first pilot valve of the work operation device 44 and the pressure receiving portion on the one side of the swing control valve 43, and a swing lock valve 45B that can be switched to an interrupting state and a communicating state is provided to a hydraulic line between the second pilot valve of the work operation device 44 and the pressure receiving portion on the other side of the swing control valve 43. The swing lock valves 45A and 45B correspond to a swing lock device that sets a locking state of inhibiting the swing action of the swing structure as described in claims.

When the swing lock valves 45A and 45B are in the interrupting state (locking state), the swing control valve 43 cannot be switched despite the operation in the left-right direction of the work operation lever 39, and hence, the swing motor 14 does not rotate. That is, the swing action of the swing structure 12 is inhibited. When the swing lock valves 45A and 45B are in the communicating state (unlocking state), on the other hand, the swing control valve 43 can be switched according to operation in the left-right direction of the work operation lever 39, and hence, the swing motor 14 rotates.

That is, the swing action of the swing structure 12 is permitted.

The electrically driven motor 40 is driven by electric power supplied from the external power supply 1 via the feeding cable 2. Alternatively, the electrically driven motor 40 is driven by the electric power of a battery 46 (see FIG. 4 to be described later) charged by the electric power supplied from the external power supply 1 via the feeding cable 2. An electric system of the electrically driven excavator thus configured will be described with reference to FIG. 4. FIG. 4 is a block diagram illustrating a configuration of the electric system of the electrically driven excavator in the present embodiment together with related apparatuses.

The electric system in the present embodiment includes a rectifier 47 that converts the alternating-current power supplied from the external power supply 1 via the feeding cable 2 into direct-current power; an inverter 48 that controls the rotational speed of the electrically driven motor 40; a switch 49 that switches connection between the rectifier 47, the inverter 48, and the battery 46; and a controller 50 that controls the switch 49, the inverter 48, and the like. Incidentally, the battery 46, the rectifier 47, the inverter 48, the switch 49, and the controller 50 are mounted in the swing structure 12 (see FIG. 2 described above).

Though not illustrated, the controller 50 includes a processor that performs processing according to a program, a memory that stores the program and data, and the like. When the connection sensor 32 senses a state in which the feeding cable 2 is connected to the feeding port 31, the controller 50 controls the switch 49 to connect the rectifier 47 and the inverter 48 to each other. In this case, the electrically driven motor 40 is driven by the electric power supplied from the external power supply 1 via the feeding cable 2.

Alternatively, when the connection sensor 32 senses a state in which the feeding cable 2 is connected to the feeding port 31, the controller 50 controls the switch 49 to connect the rectifier 47 and the battery 46 to each other. The battery 46 is thus charged by the electric power supplied from the external power supply 1 via the feeding cable 2. When the connection sensor 32 senses a state in which the feeding cable 2 is not connected to the feeding port 31, the controller 50 controls the switch 49 to connect the inverter 48 and the battery 46 to each other. In this case, the electrically driven motor 40 is driven by the electric power of the battery 46.

As one of the features of the present embodiment, when the connection sensor 32 senses a state in which the feeding cable 2 is connected to the feeding port 31, the controller 50 computes the position of the holding unit 36 of the cable stand 33 (for example, polar coordinates with the center of the track structure 11 as an origin) on the basis of sensing results of the swing angle sensor 15 and the rotational angle sensor 37. Further, the controller 50 performs swing lock control that controls the swing lock valves 45A and 45B according to the computed position of the holding unit 36 of the cable stand 33.

The foregoing swing lock control will be described with reference to FIG. 5. FIG. 5 is a flowchart illustrating the contents of the swing lock control in the present embodiment.

In step S1, the controller 50 determines, on the basis of a sensing result of the connection sensor 32, whether the feeding cable 2 is in a state of being connected to the feeding port 31. When the feeding cable 2 is not in the state of being connected to the feeding port 31, the processing proceeds to step S2. In step S2, the controller 50 controls the swing lock valves 45A and 45B to an unlocking state. The swinging of the swing structure 12 is thus permitted.

When the feeding cable 2 is in the state of being connected to the feeding port 31, the processing proceeds to step S3. In step S3, the controller 50 computes the position of the holding unit 36 of the cable stand 33 on the basis of sensing results of the swing angle sensor 15 and the rotational angle sensor 37. The processing thereafter proceeds to step S4, where the controller 50 determines whether the computed position of the holding unit 36 of the cable stand 33 is located within a predetermined range D1. As illustrated in FIG. 6A and FIG. 6B, the predetermined range D1 is set in advance as a range in which the feeding cable 2 held by the holding unit 36 of the cable stand 33 does not come into contact with the track structure 11, on the premise that the external power supply 1 is disposed rearward of the track structure 11. The predetermined range D1 is stored in the controller 50.

As illustrated in FIG. 6A, for example, when the computed position of the holding unit 36 of the cable stand 33 is located within the predetermined range D1, the processing proceeds to step S2. In step S2, the controller 50 controls the swing lock valves 45A and 45B to an unlocking state. The swinging of the swing structure 12 is thus permitted. On the other hand, as illustrated in FIG. 6B, for example, when the computed position of the holding unit 36 of the cable stand 33 is outside the predetermined range D1, the processing proceeds to step S5. In step S5, the controller 50 controls the swing lock valves 45A and 45B to a locking state. The swinging of the swing structure 12 is thus inhibited.

As described above, the electrically driven excavator in the present embodiment allows a swing action to be performed even in a state in which the feeding cable 2 is connected. However, the swing action is inhibited when there is a possibility that the feeding cable 2 held by the holding unit 36 of the cable stand 33 is damaged by coming into contact with the track structure 11. It is thus possible to suppress damage to the feeding cable 2.

Incidentally, in the first embodiment, description has been made by taking as an example a case where the predetermined range set for the position of the holding unit 36 of the cable stand 33 is fixed on the premise that the external power supply 1 is disposed rearward of the track structure 11. However, there is no limitation to this. That is, the predetermined range set for the holding unit 36 of the cable stand 33 may be changed according to the disposition of the external power supply 1. Such a modification will be described with reference to FIG. 7, FIG. 8, FIG. 9A, and FIG. 9B. Incidentally, parts similar to those of the first embodiment are identified by the same reference characters, and description thereof will be omitted as appropriate.

The electrically driven excavator in the present modification includes an input device 51 that is disposed within the cab 29 and can perform input regarding the disposition of the external power supply 1 with respect to the track structure 11 (see FIG. 7). The input device 51 includes, for example, a display that makes display to the effect that one of the rear side, the left side, and the right side of the track structure 11 is to be selected as the disposition of the external power supply 1 and buttons for selecting one of the rear side, the left side, and the right side of the track structure 11 as the disposition of the external power supply 1.

The controller 50 stores the predetermined ranges D1, D2, and D3 (see FIG. 8) set for the position of the holding unit 36 of the cable stand 33. As described above, the predetermined range D1 is set in advance as a range in which the feeding cable 2 held by the holding unit 36 of the cable stand 33 does not come into contact with the track structure 11, on the premise that the external power supply 1 is disposed rearward of the track structure 11 (on the right side of FIG. 8). The predetermined range D2 is set in advance as a range in which the feeding cable 2 held by the holding unit 36 of the cable stand 33 does not come into contact with the track structure 11, on the premise that the external power supply 1 is disposed on the left side of the track structure 11 (on the lower side of FIG. 8). The predetermined range D3 is set in advance as a range in which the feeding cable 2 held by the holding unit 36 of the cable stand 33 does not come into contact with the track structure 11 on the premise that the external power supply 1 is disposed on the right side of the track structure 11 (on the upper side of FIG. 8).

The controller 50 changes the predetermined range according to the disposition of the external power supply 1 input by the input device 51. For example, as illustrated in FIG. 9A and FIG. 9B, when the disposition of the external power supply 1 input by the input device 51 is on the right side of the track structure 11, the predetermined range is changed to the predetermined range D3. Further, as illustrated in FIG. 9A and FIG. 9B, when the position of the holding unit 36 of the cable stand 33 goes outside the predetermined range D1, the swing lock valves 45A and 45B are controlled to a locking state, and the swinging of the swing structure 12 is thereby inhibited.

The present modification also provides effects similar to those of the first embodiment.

A second embodiment of the present invention will be described with reference to the drawings. Incidentally, in the present embodiment, parts similar to those of the first embodiment are identified by the same reference characters, and description thereof will be omitted as appropriate.

FIG. 10 is a diagram illustrating a configuration related to the travelling motor in a configuration of a drive system of an electrically driven excavator in the present embodiment. FIG. 11 is a block diagram illustrating a configuration of an electric system of the electrically driven excavator in the present embodiment together with related apparatuses.

The drive system in the present embodiment includes a travelling control valve 52A that controls a flow (specifically, a direction and a flow rate) of hydraulic fluid from the hydraulic pump 41 to the travelling motor 20A on the left side; a travelling operation device 53A that switches the travelling control valve 52A; a travelling control valve 52B that controls a flow (specifically, a direction and a flow rate) of hydraulic fluid from the hydraulic pump 41 to the travelling motor 20B on the right side; and a travelling operation device 53B that switches the travelling control valve 52B. Incidentally, the travelling operation devices 53A and 53B are mounted in the cab 29 of the swing structure 12, and the travelling control valves 52A and 52B are mounted in another part of the swing structure 12.

The travelling operation device 53A includes the above-described travelling operation lever pedal 38A; a third pilot valve (not illustrated) that generates the pilot pressure by reducing the delivery pressure of the pilot pump 42 according to an amount of operation of the travelling operation lever pedal 38A to the front side; and a fourth pilot valve (not illustrated) that generates a pilot pressure by reducing the delivery pressure of the pilot pump 42 according to an amount of operation of the travelling operation lever pedal 38A to the rear side.

The travelling operation device 53B includes the above-described travelling operation lever pedal 38B; a fifth pilot valve (not illustrated) that generates a pilot pressure by reducing the delivery pressure of the pilot pump 42 according to an amount of operation of the travelling operation lever pedal 38B to the front side; and a sixth pilot valve (not illustrated) that generates a pilot pressure by reducing the delivery pressure of the pilot pump 42 according to an amount of operation of the travelling operation lever pedal 38B to the rear side.

When the driver operates the travelling operation lever pedal 38A to the front side, the pilot pressure generated by the third pilot valve according to the operation amount of the travelling operation lever pedal 38A is output to a pressure receiving portion on one side of the travelling control valve 52A. Thus, the travelling control valve 52A is switched to a switching position on the left side illustrated in the figure, the hydraulic fluid from the hydraulic pump 41 is supplied to a port on the left side illustrated in the figure of the travelling motor 20A via the travelling control valve 52A, and the travelling motor 20A rotates in a forward direction. When the driver operates the travelling operation lever pedal 38B to the front side simultaneously with this, the pilot pressure generated by the fifth pilot valve according to the operation amount of the travelling operation lever pedal 38B is output to a pressure receiving portion on one side of the travelling control valve 52B. Thus, the travelling control valve 52B is switched to a switching position on the left side illustrated in the figure, the hydraulic fluid from the hydraulic pump 41 is supplied to a port on the left side illustrated in the figure of the travelling motor 20B via the travelling control valve 52B, and the travelling motor 20B rotates in the forward direction. As a result, the track structure 11 advances.

When the driver operates the travelling operation lever pedal 38A to the rear side, the pilot pressure generated by the fourth pilot valve according to the operation amount of the travelling operation lever pedal 38A is output to a pressure receiving portion on another side of the travelling control valve 52A. Thus, the travelling control valve 52A is switched to a switching position on the right side illustrated in the figure, the hydraulic fluid from the hydraulic pump 41 is supplied to a port on the right side illustrated in the figure of the travelling motor 20A via the travelling control valve 52A, and the travelling motor 20A rotates in the rearward direction. When the driver operates the travelling operation lever pedal 38B to the rear side simultaneously with this, the pilot pressure generated by the sixth pilot valve according to the operation amount of the travelling operation lever pedal 38B is output to a pressure receiving portion on another side of the travelling control valve 52B. Thus, the travelling control valve 52B is switched to a switching position on the right side illustrated in the figure, the hydraulic fluid from the hydraulic pump 41 is supplied to a port on the right side illustrated in the figure of the travelling motor 20B via the travelling control valve 52B, and the travelling motor 20B rotates in the rearward direction. As a result, the track structure 11 reverses.

As one of features of the present embodiment, an advance lock valve 54A that can be switched to an interrupting state and a communicating state is provided to a hydraulic line between the third pilot valve of the travelling operation device 53A and the pressure receiving portion on the one side of the travelling control valve 52A, and an advance lock valve 54B that can be switched to an interrupting state and a communicating state is provided to a hydraulic line between the fifth pilot valve of the travelling operation device 53B and the pressure receiving portion on the one side of the travelling control valve 52B. The advance lock valves 54A and 54B correspond to an advance lock device that sets a locking state of inhibiting an advance of the track structure as described in claims.

When the advance lock valves 54A and 54B are in the interrupting state (locking state), the travelling control valves 52A and 52B cannot be switched irrespective of operation of the travelling operation lever pedals 38A and 38B to the front side, and hence, the travelling motors 20A and 20B do not rotate in the forward direction. That is, the advance of the track structure 11 is inhibited. When the advance lock valves 54A and 54B are in the communicating state (unlocking state), on the other hand, the travelling control valves 52A and 52B can be switched according to operation of the travelling operation lever pedals 38A and 38B to the front side, and hence, the travelling motors 20A and 20B rotate in the forward direction. That is, the advance of the track structure 11 is permitted.

As one of the features of the present embodiment, a reverse lock valve 55A that can be switched to an interrupting state and a communicating state is provided to a hydraulic line between the fourth pilot valve of the travelling operation device 53A and the pressure receiving portion on the other side of the travelling control valve 52A, and a reverse lock valve 55B that can be switched to an interrupting state and a communicating state is provided to a hydraulic line between the sixth pilot valve of the travelling operation device 53B and the pressure receiving portion on the other side of the travelling control valve 52B. The reverse lock valves 55A and 55B correspond to a reverse lock device that sets a locking state of inhibiting a reverse of the track structure as described in claims.

When the reverse lock valves 55A and 55B are in the interrupting state (locking state), the travelling control valves 52A and 52B cannot be switched irrespective of operation of the travelling operation lever pedals 38A and 38B to the rear side, and hence, the travelling motors 20A and 20B do not rotate in the rearward direction. That is, the reverse of the track structure 11 is inhibited. When the reverse lock valves 55A and 55B are in the communicating state (unlocking state), on the other hand, the travelling control valves 52A and 52B can be switched according to operation of the travelling operation lever pedals 38A and 38B to the rear side, and hence, the travelling motors 20A and 20B rotate in the rearward direction. That is, the reverse of the track structure 11 is permitted.

As one of the features of the present embodiment, when the connection sensor 32 senses a state in which the feeding cable 2 is connected to the feeding port 31, the controller 50 computes the position of the holding unit 36 of the cable stand 33 (for example, polar coordinates with the center of the track structure 11 as an origin) on the basis of sensing results of the swing angle sensor 15 and the rotational angle sensor 37. Further, the controller 50 performs travelling lock control that controls the advance lock valves 54A and 54B and the reverse lock valves 55A and 55B according to the computed position of the holding unit 36 of the cable stand 33.

The foregoing travelling lock control will be described with reference to FIG. 12. FIG. 12 is a flowchart illustrating the contents of the travelling lock control in the present embodiment.

In step S1, the controller 50 determines, on the basis of a sensing result of the connection sensor 32, whether the feeding cable 2 is in a state of being connected to the feeding port 31. When the feeding cable 2 is not in the state of being connected to the feeding port 31, the processing proceeds to step S6. In step S6, the controller 50 controls the advance lock valves 54A and 54B and the reverse lock valves 55A and 55B to an unlocking state. The advance and reverse of the track structure 11 are thus permitted.

When the feeding cable 2 is in the state of being connected to the feeding port 31, the processing proceeds to step S3. In step S3, the controller 50 computes the position of the holding unit 36 of the cable stand 33 on the basis of sensing results of the swing angle sensor 15 and the rotational angle sensor 37. The processing thereafter proceeds to step S7, where the controller 50 determines whether the computed position of the holding unit 36 of the cable stand 33 is located within a first range E1. As illustrated in FIG. 13A, the first range E1 is set in advance as a range in which there is a possibility that the feeding cable 2 held by the holding unit 36 of the cable stand 33 is trodden by the track structure 11 that is advancing, on the premise that the external power supply 1 is disposed rearward of the track structure 11. The first range E1 is stored in the controller 50.

As illustrated in FIG. 13A, for example, when the computed position of the holding unit 36 of the cable stand 33 is not located in the first range E1, the processing proceeds to step S8. In step S8, the controller 50 controls the advance lock valves 54A and 54B to an unlocking state. The advance of the track structure 11 is thus permitted. On the other hand, as illustrated in FIG. 13B, for example, when the computed position of the holding unit 36 of the cable stand 33 is located in the first range E1, the processing proceeds to step S9. In step S9, the controller 50 controls the advance lock valves 54A and 54B to a locking state. The advance of the track structure 11 is thus inhibited.

The processing thereafter proceeds to step S10, where the controller 50 determines whether the computed position of the holding unit 36 of the cable stand 33 is located within a second range F1. As illustrated in FIG. 13A, the second range F1 is set in advance as a range in which there is a possibility that the feeding cable 2 held by the holding unit 36 of the cable stand 33 is trodden by the track structure 11 that is reversing, on the premise that the external power supply 1 is disposed rearward of the track structure 11. The second range F1 is stored in the controller 50. Incidentally, in the present embodiment, the second range F1 is 360 degrees.

The processing proceeds to step S11 if the computed position of the holding unit 36 of the cable stand 33 is not located in the second range (which is not possible in the case of the second range F1 in the present embodiment, but is possible in the case of a second range F2 in a modification to be described later). In step S11, the controller 50 controls the reverse lock valves 55A and 55B to an unlocking state. The reverse of the track structure 11 is thus permitted. On the other hand, as illustrated in FIG. 13A and FIG. 13B, when the computed position of the holding unit 36 of the cable stand 33 is located in the second range F1, the processing proceeds to step S12. In step S12, the controller 50 controls the reverse lock valves 55A and 55B to a locking state. The reverse of the track structure 11 is thus inhibited.

As described above, the electrically driven excavator in the present embodiment can perform a travelling action (only an advance in the present embodiment) even in a state in which the feeding cable 2 is connected. However, the travelling action is inhibited when there is a possibility that the feeding cable 2 held by the holding unit 36 of the cable stand 33 is trodden by the track structure 11 that is travelling. It is thus possible to suppress damage to the feeding cable 2.

Incidentally, in the second embodiment, description has been made by taking as an example a case where the first and second ranges set for the position of the holding unit 36 of the cable stand 33 are fixed on the premise that the external power supply 1 is disposed rearward of the track structure 11. However, there is no limitation to this. Specifically, the first and second ranges set for the holding unit 36 of the cable stand 33 may be changed according to the disposition of the external power supply 1. Such a modification will be described with reference to FIG. 14, FIG. 15, FIG. 16A, and FIG. 16B. Incidentally, parts similar to those of the second embodiment are identified by the same reference characters, and description thereof will be omitted as appropriate.

The electrically driven excavator in the present modification includes the input device 51 that is disposed within the cab 29 and can input the disposition of the external power supply 1 with respect to the track structure 11 (see FIG. 14).

The controller 50 further stores a first range E2 and a second range F2 (see FIG. 15) set for the position of the holding unit 36 of the cable stand 33. The first range E2 is set in advance as a range in which there is a possibility that the feeding cable 2 held by the holding unit 36 of the cable stand 33 is trodden by the track structure 11 that is advancing, on the premise that the external power supply 1 is disposed on the left side (on the lower side of FIG. 15) or the right side (on the upper side of FIG. 15) of the track structure 11. The second range F2 is set in advance as a range in which there is a possibility that the feeding cable 2 held by the holding unit 36 of the cable stand 33 is trodden by the track structure 11 that is reversing, on the premise that the external power supply 1 is disposed on the left side or the right side of the track structure 11.

The controller 50 changes the first and second ranges according to the disposition of the external power supply 1 input by the input device 51. For example, as illustrated in FIG. 16A and FIG. 16B, when the disposition of the external power supply 1 input by the input device 51 is on the right side of the track structure 11, the first and second ranges are changed to the first range E2 and the second range F2. Further, as illustrated in FIG. 16A, for example, when the position of the holding unit 36 of the cable stand 33 is located in the first range E2, the advance lock valves 54A and 54B are controlled to a locking state, and the advance of the track structure 11 is inhibited. For example, as illustrated in FIG. 16B, when the position of the holding unit 36 of the cable stand 33 is located in the second range F2, the reverse lock valves 55A and 55B are controlled to a locking state, and the reverse of the track structure 11 is inhibited.

The present modification also provides effects similar to those of the second embodiment.

Incidentally, in the first embodiment and the modification thereof and the second embodiment and the modification thereof, description has been made by taking as an example a case where the operation device includes a pilot valve that generates a pilot pressure by reducing the delivery pressure of the pilot pump 42 according to the operation amount of an operation member and that outputs the generated pilot pressure to a pressure receiving portion of a control valve. However, there is no limitation to this. The operation device may include a potentiometer that senses the operation amount of the operation member and outputs a signal of the sensing to the controller 50. In this modification, the controller 50 generates a driving signal corresponding to the sensing signal of the operation device, and outputs the generated driving signal to a solenoid proportional valve. The solenoid proportional valve generates a pilot pressure by reducing the delivery pressure of the pilot pump 42 according to the driving signal, and outputs the generated pilot pressure to the pressure receiving portion of the control valve. The controller 50 switches a lock valve provided to a hydraulic line between the solenoid proportional valve and the pressure receiving portion of the control valve between an interrupting state and a communicating state, or switches between the enabling and disabling of the sensing signal output from the operation device. The swing lock control or the travelling lock control may accordingly be performed. Such a modification also provides effects similar to the foregoing.

Incidentally, in the first embodiment and the modification thereof, description has been made by taking as an example a case where the swing lock control is performed, and in the second embodiment and the modification thereof, description has been made by taking as an example a case where the travelling lock control is performed. However, the swing lock control and the travelling lock control may be combined with each other.

It is to be noted that in the above, description has been made by taking an electrically driven excavator as a target of application of the present invention by way of example. However, without being limited to this, the present invention may be applied to other electrically driven construction machines.

DESCRIPTION OF REFERENCE CHARACTERS

1: External power supply
2: Feeding cable
11: Track structure
12: Swing structure
13: Work device
15: Swing angle sensor
31: Feeding port
32: Connection sensor
33: Cable stand
36: Holding unit
37: Rotational angle sensor
45A, 45B: Swing lock valve (swing lock device)
50: Controller
51: Input device
54A, 54B: Advance lock valve (advance lock device)
55A, 55B: Reverse lock valve (reverse lock device)

The invention claimed is:

1. An electrically driven construction machine comprising:

a track structure;

a swing structure provided swingably to an upper side of the track structure;

a work device coupled to the swing structure;

a feeding port disposed in the swing structure and connected with a feeding cable from an external power supply;

a cable stand that is disposed on the swing structure, has a holding unit that holds the feeding cable, and allows the holding unit to be revolvable about a vertical axis;

a connection sensor that senses a state in which the feeding cable is connected to the feeding port;

a swing angle sensor that senses a swing angle of the swing structure;

a rotational angle sensor that senses a rotational angle of the holding unit of the cable stand;

a swing lock device that sets a locking state of inhibiting a swing action of the swing structure; and a controller that controls the swing lock device, the controller being configured to compute a position of the holding unit of the cable stand on a basis of sensing results of the swing angle sensor and the rotational angle sensor when the connection sensor senses the state in which the feeding cable is connected to the feeding port, and control the swing lock device to the locking state when the computed position of the holding unit of the cable stand goes outside a predetermined range.

2. The electrically driven construction machine according to claim 1, comprising:

an input device that is capable of inputting a disposition of the external power supply with respect to the track structure, wherein the controller is configured to change the predetermined range according to the disposition of the external power supply, the disposition being input by the input device.

3. An electrically driven construction machine comprising:

a track structure;

a swing structure provided swingably to an upper side of the track structure;

a work device coupled to the swing structure;

a feeding port disposed in the swing structure and connected with a feeding cable from an external power supply;

a cable stand that is disposed on the swing structure, has a holding unit that holds the feeding cable, and allows the holding unit to be revolvable about a vertical axis;

a connection sensor that senses a state in which the feeding cable is connected to the feeding port;

a swing angle sensor that senses a swing angle of the swing structure;

a rotational angle sensor that senses a rotational angle of the holding unit of the cable stand;

an advance lock device that sets a locking state of inhibiting an advance of the track structure;

a reverse lock device that sets a locking state of inhibiting a reverse of the track structure; and a controller that controls the advance lock device and the reverse lock device, the controller being configured to compute a position of the holding unit of the cable stand on a basis of sensing results of the swing angle sensor and the rotational angle sensor when the connection sensor senses the state in which the feeding cable is connected to the feeding port, control the advance lock device to the locking state when the computed position of the holding unit of the cable stand is located within a first range, and control the reverse lock device to the locking state when the computed position of the holding unit of the cable stand is located within a second range.

4. The electrically driven construction machine according to claim 3, comprising:

an input device that is capable of inputting a disposition of the external power supply with respect to the track structure, wherein the controller is configured to change the first range and the second range according to the disposition of the external power supply, the disposition being input by the input device.

* * * * *